E. N. BREITUNG.
WHEEL.
APPLICATION FILED FEB. 14, 1912.
1,037,199.
Patented Sept. 3, 1912.
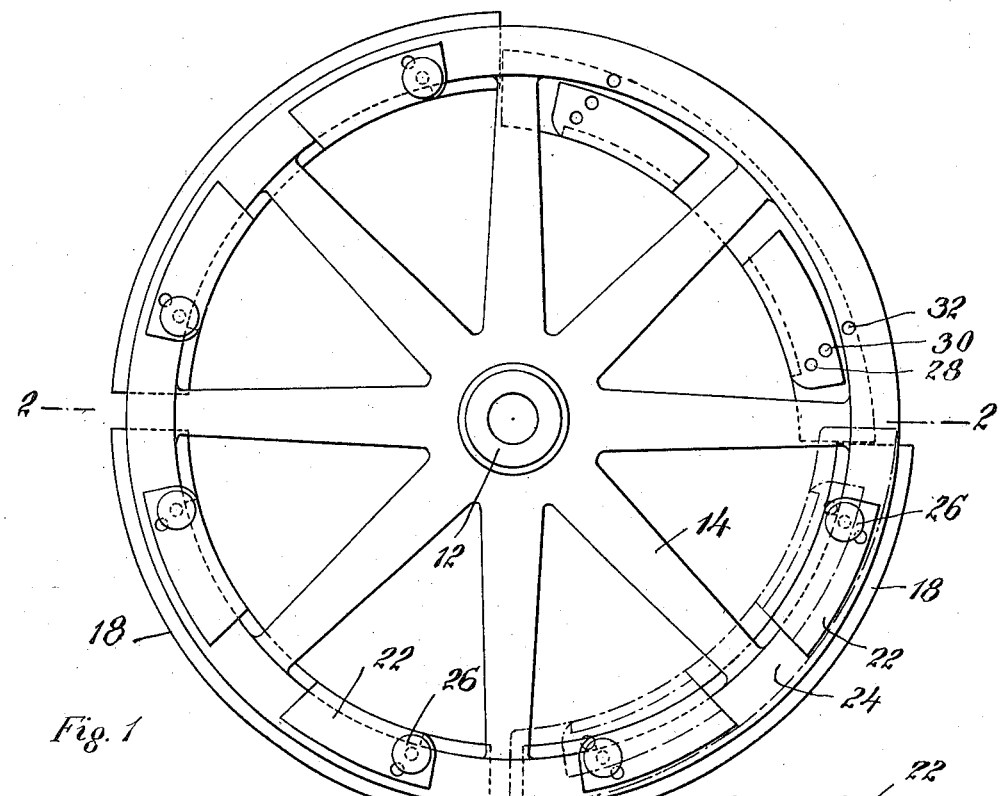
Fig. 1
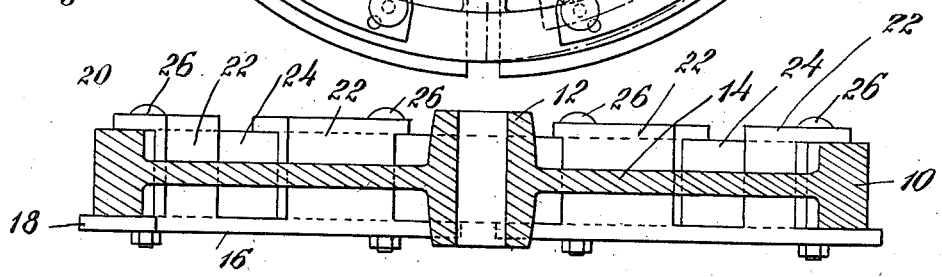
Fig. 2
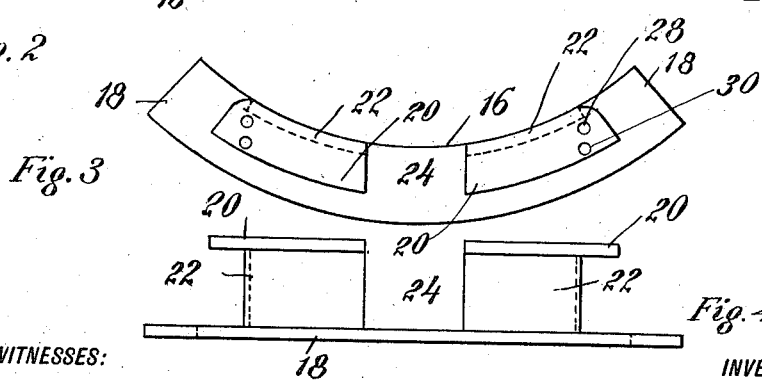
Fig. 3
Fig. 4
WITNESSES:
INVENTOR
Edward Nicklas Breitung
BY
E. W. Marshall
ATTORNEY

UNITED STATES PATENT OFFICE.

EDWARD NICKLAS BREITUNG, OF MARQUETTE, MICHIGAN.

WHEEL.

1,037,199.  Specification of Letters Patent.  Patented Sept. 3, 1912.

Application filed February 14, 1912. Serial No. 677,521.

*To all whom it may concern:*

Be it known that I, EDWARD NICKLAS BREITUNG, a citizen of the United States, and a resident of the city of Marquette, county of Marquette, and State of Michigan, have invented certain new and useful Improvements in Wheels, of which the following is a specification.

My invention relates to vehicle wheels adapted to run either on tracks or on roads, being provided with adjustable parts that will form with the rim of a wheel a flange, thereby giving it a shape which may be used on rails or tracks. By removing the parts, a wheel having a cylindrical periphery is obtained, which is adapted to run on ordinary roads.

I will describe my invention in the following specification and point out the novel features thereof in the appended claims.

Referring to the drawing: Figure 1 is a side elevation showing a wheel made according to my invention, with the flange forming parts in different positions. Fig. 2 is a horizontal sectional view taken on the line 2—2 in Fig. 1. Fig. 3 is a side elevation of one segment of the flange-rim. Fig. 4 is a bottom plan view of the same.

As illustrated in the drawing the wheel proper is composed of a rim 10, hub 12 and spokes 14, all of which may be cast integrally. This form of wheel is adapted for use on roads, or any other surfaces where a smooth cylindrical tread free from projecting flanges is required.

In order to adapt the wheel for use on rails or tracks, a removable flanged rim is provided. In the specific embodiment of the invention shown herein this rim is composed of a plurality of segmental rim sections 16 which are arranged to be bolted to the rim of the wheel. In the present instance a wheel is shown having four rim sections, but obviously any desired number may be employed. Each rim section is composed of an outer arcuate flange 18 which forms the flange of the wheel, and a pair of inner arcuate flanges 20 adapted to bear against the inner face of the rim 10 and united to the outer flange 18 by webs 22. By this construction a shoe is formed which is U-shaped in cross-section and adapted to fit around the inner periphery and the side faces of the wheel rim. A recess 24 is provided which separates the inner flanges and the webs and receives a spoke 14 of the wheel. The removable rim sections 16 are secured to the rim of the wheel by some suitable means such as bolts 26 which are adapted to pass through holes 28 or 30 provided in the arcuate flanges of the rim section and through holes 32 in the solid wheel rim 10.

When it is desired to change the wheel into a flanged one for railroad use the rim sections 16 are placed in the position shown in full lines in Fig. 1 and secured in this position by passing the bolts 26 through the holes 28 in the flanges and through the bolt holes 32 in the solid rim 10.

When it is desired to provide a wheel with a plain tread, the rim sections 16 are placed in the dot-and-dash line position shown in the lower right hand quarter of Fig. 1 and the bolts 26 are passed through the holes 30 in the flanges and through the holes 32 in the solid rim 10. When it is desired to take the rim sections off, the bolts 26 are removed, then the sections are moved inwardly to the dotted line position shown in the upper right hand quarter of Fig. 1 whereupon they may be moved laterally to free them from the wheel. When the rim sections are in their inner attached position they form a continuous wheel rim. I have therefore provided a universal vehicle wheel which may be used on any surface over which a vehicle may be run.

What I claim is:

1. A wheel comprising a solid rim with the opposite sides thereof in parallel planes, a plurality of removable rim sections each comprising two side members adjacent said rim sides, one of said members being adapted to serve as a portion of a flange for the wheel, and means for independently affixing said sections to the rim in two definite positions.

2. A wheel comprising a solid rim having a plain outer periphery adapted for use on roads, and sides at right angles to said periphery, a plurality of removable rim sections each comprising an outer flange adapted to form a portion of a flange for the wheel, two inner flanges, and connecting webs between the outer flange and said inner flanges, and bolts adapted to secure said rim sections to the wheel rim with the outer peripheries of their outer flanges inside of the periphery of the rim or with said outer flanges projecting beyond the rim periphery.

3. A wheel comprising a solid rim having a plain outer periphery adapted for use on roads and sides at right angles to said periphery, a hub, and integral spokes between said rim and hub, a plurality of removable rim sections each comprising an outer flange adapted to form a portion of a flange for the wheel, two inner flanges, and connecting webs between the outer flange and said inner flanges, constructed to lie on both sides of one of said spokes, and bolts adapted to secure said rim sections to the wheel rim with the outer peripheries of their outer flanges inside of the periphery of the rim or with said outer flanges projecting beyond the rim periphery.

In witness whereof I have hereunto set my hand this 10th day of February, 1912.

EDWARD NICKLAS BREITUNG.

Witnesses:
JOHN T. SMITH,
P. BEN SMALLEY.